US010082071B2

(12) United States Patent
Iwata

(10) Patent No.: US 10,082,071 B2
(45) Date of Patent: Sep. 25, 2018

(54) TURBOCHARGER WITH IMPROVED BYPASS VALVE SEALING HAVING A POSITIONING BOLT

(71) Applicant: TOYOTA JIDOSHA KABUSHIKI KAISHA, Toyota-shi, Aichi-ken (JP)

(72) Inventor: Akitoshi Iwata, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 15/107,205

(22) PCT Filed: Dec. 23, 2014

(86) PCT No.: PCT/IB2014/002863
§ 371 (c)(1),
(2) Date: Jun. 22, 2016

(87) PCT Pub. No.: WO2015/097532
PCT Pub. Date: Jul. 2, 2015

(65) Prior Publication Data
US 2016/0341110 A1 Nov. 24, 2016

(30) Foreign Application Priority Data

Dec. 26, 2013 (JP) ................................. 2013-269563

(51) Int. Cl.
F02D 23/00 (2006.01)
F02B 37/18 (2006.01)
(Continued)

(52) U.S. Cl.
CPC .......... F02B 37/186 (2013.01); F01D 17/105 (2013.01); F01D 17/145 (2013.01);
(Continued)

(58) Field of Classification Search
CPC ...... F02B 37/186; F02B 37/183; F02B 39/00; F01D 17/105; F01D 17/145; F01D 25/12;
(Continued)

(56) References Cited

U.S. PATENT DOCUMENTS 5,406,795 A * 4/1995 Raub ....................... F01D 9/026
60/605.1
5,855,460 A * 1/1999 Brehmer ............... F16B 31/025
411/14

(Continued)

FOREIGN PATENT DOCUMENTS

CN 103912318 A * 7/2014
DE 2943756 A1 * 5/1980 ............. F01D 9/026
(Continued)

Primary Examiner — Thai Ba Trieu
(74) Attorney, Agent, or Firm — Oliff PLC

(57) ABSTRACT

A supercharger includes a turbine housing, a bypass port, and a reinforcing member. The turbine housing includes a bypass passage allowing exhaust gas to flow by bypassing a turbine chamber. The bypass port is fixed to the turbine housing, and the waste gate valve is configured to abut against a first surface of the bypass port when the waste gate valve is closed. The reinforcing member is disposed at a part of the turbine housing that supports the bypass port. The reinforcing member is formed of a material higher in rigidity than a material constituting the turbine housing and is configured to abut against a second surface of the bypass port. The second surface is on a side opposite to the first surface of the bypass port. The reinforcing member extends from the second surface toward an outer side of the turbine housing.

5 Claims, 4 Drawing Sheets

(51) Int. Cl.
*F01D 17/10* (2006.01)
*F01D 17/18* (2006.01)
*F01D 25/12* (2006.01)
*F01D 25/14* (2006.01)
*F02C 6/12* (2006.01)
*F02B 39/00* (2006.01)
*F01D 17/14* (2006.01)
*F01D 25/24* (2006.01)

(52) U.S. Cl.
CPC ............. *F01D 17/18* (2013.01); *F01D 25/12* (2013.01); *F01D 25/145* (2013.01); *F01D 25/24* (2013.01); *F02B 37/183* (2013.01); *F02B 39/00* (2013.01); *F02C 6/12* (2013.01); F05D 2220/40 (2013.01); F05D 2260/606 (2013.01); Y02T 10/144 (2013.01)

(58) Field of Classification Search
CPC .......... F01D 25/145; F01D 25/14; F02C 6/12; F05D 2220/40; F05D 2260/606; Y02T 10/144
USPC .......................................................... 60/602
See application file for complete search history.

(56) References Cited

U.S. PATENT DOCUMENTS

| | | | |
|---|---|---|---|
| 6,073,912 A | 6/2000 | Mori et al. | |
| 7,290,392 B2 * | 11/2007 | Jones | F02B 37/186 248/316.5 |
| 7,802,428 B2 * | 9/2010 | Perrin | F02B 37/007 60/602 |
| 8,763,628 B2 * | 7/2014 | Buttafuoco | F16F 1/3732 137/351 |
| 2009/0151348 A1 * | 6/2009 | Hayashi | F01D 25/24 60/598 |
| 2012/0317975 A1 | 12/2012 | Schoenherr et al. | |
| 2013/0139502 A1 * | 6/2013 | Chu | F02B 37/186 60/602 |
| 2015/0354409 A1 * | 12/2015 | Petty | F01D 25/24 49/465 |
| 2016/0076582 A1 * | 3/2016 | Bucking | F16C 11/08 403/122 |
| 2016/0146098 A1 * | 5/2016 | Dilalan | F02B 37/186 251/228 |
| 2016/0169097 A1 * | 6/2016 | Chu | F02B 39/16 60/602 |
| 2016/0177814 A1 * | 6/2016 | McHenry | F02B 37/183 415/1 |
| 2016/0178105 A1 * | 6/2016 | McHenry | F02B 37/183 285/41 |
| 2016/0265484 A1 * | 9/2016 | Annati | F01D 25/14 |

FOREIGN PATENT DOCUMENTS

| | | | |
|---|---|---|---|
| DE | 102008029342 A1 | 12/2009 | |
| DE | 102008032927 A1 * | 1/2010 | ........... F01D 17/105 |
| JP | H01-76523 U | 5/1989 | |
| JP | H11-62525 A | 3/1999 | |
| JP | 2006-063851 A | 3/2006 | |
| JP | 2012-219640 A | 11/2012 | |
| JP | 2013-509534 A | 3/2013 | |
| WO | 2011/053513 A2 | 5/2011 | |

* cited by examiner

TURBOCHARGER WITH IMPROVED BYPASS VALVE SEALING HAVING A POSITIONING BOLT

1. FIELD OF THE INVENTION

The invention relates to a supercharger that is disposed in an internal combustion engine.

2. DESCRIPTION OF RELATED ART

Published Japanese Translation of PCT application No. 2013-509534 (JP-A-2013-509534) discloses a supercharger in which a bypass passage is disposed in a turbine housing of the supercharger so as to allow exhaust gas to flow by bypassing a turbine chamber accommodating a turbine wheel. A waste gate valve that opens or closes the bypass passage is disposed in the supercharger described in JP-A-2013-509534. In the supercharger, a bypass port that has an annular shape is fitted into a bypass passage outlet part of the turbine housing, and the waste gate valve abuts against the bypass port.

SUMMARY OF THE INVENTION

The turbine housing is formed of a metal such as aluminum and iron. Accordingly, when the turbine housing is heated by heat of the exhaust gas, the rigidity of the turbine housing declines. In the supercharger that is described in JP-A-2013-509534, the bypass port is fixed to the turbine housing, and thus an impact which is generated when the waste gate valve is closed acts on the turbine housing through the bypass port. Accordingly, a part to which the bypass port is fixed may be deformed by the impact when the turbine housing is heated by the heat of the exhaust gas and the temperature of the part to which the bypass port is fixed increases. In a case where a part that supports the bypass port is deformed in this manner by the impact which is generated when the waste gate valve is closed, a close contact state between the waste gate valve and the bypass port may not be maintained when the waste gate valve is closed. This causes the sealability of the waste gate valve to decline.

The invention provides a supercharger that is capable of suppressing decline in sealability of a waste gate valve.

In an aspect of the present invention, a supercharger includes a turbine housing, a waste gate valve, a bypass port, and a reinforcing member. The turbine housing includes a bypass passage that allows exhaust gas to flow by bypassing a turbine chamber. The waste gate valve is configured to open and close the bypass passage. The bypass port is fixed to the turbine housing, and the waste gate valve is configured to abut against a first surface of the bypass port when the waste gate valve is closed. The reinforcing member is disposed at a part of the turbine housing that supports the bypass port. The reinforcing member is formed of a material higher in rigidity than a material constituting the turbine housing. The reinforcing member configured to abut against a second surface of the bypass port. The second surface is on a side opposite to the first surface of the bypass port. The reinforcing member extends from the second surface toward an outer side of the turbine housing.

An outer side part of the turbine housing is cooled by outside air. Accordingly, the temperature of the outer side part of the turbine housing is likely to decline compared to an inner side part of the turbine housing through which the exhaust passes. Therefore, the turbine housing is maintained in a state where the rigidity is higher at the outer side part.

According to the configuration described above, the reinforcing member is disposed at a part of the turbine housing to which the bypass port is fixed. The reinforcing member extends toward the outer side of the turbine housing. In other words, the reinforcing member is supported at a part that is positioned outside the part where the bypass port is supported and is maintained in a high-rigidity state. The reinforcing member is higher in rigidity than the material constituting the turbine housing, and abuts against the second surface of the bypass port on the side opposite to the first surface of the bypass port against which the waste gate valve abuts. Accordingly, the bypass port is supported by the reinforcing member even when a force that presses the bypass port acts on the bypass port from the waste gate valve as a result of the impact which is generated when the waste gate valve is closed. Accordingly, a movement of the bypass port in a pressing direction of the waste gate valve is suppressed according to the configuration described above. As a result, a close contact state between the waste gate valve and the bypass port can be maintained when the waste gate valve is closed. Accordingly, deterioration in sealability of the waste gate valve can be suppressed according to the configuration described above.

In the supercharger described above, the reinforcing member may extend to an outer circumferential surface of the turbine housing. According to the configuration described above, the reinforcing member is cooled by the outside air. Accordingly, decline in the rigidity of the reinforcing member itself due to temperature rise can be suppressed. Accordingly, decline in supporting force can be suppressed when the bypass port is supported against the impact which is generated when the waste gate valve is closed. As described above, the turbine housing is likely to be maintained in a state where the rigidity is higher on the outer side. Accordingly, the reinforcing member can be supported at a part with higher rigidity according to the configuration described above. As a result, a movement of the bypass port attributable to the impact which is generated when the waste gate valve is closed is suppressed. Accordingly, deterioration in sealability of the waste gate valve can be suppressed according to the configuration described above.

In the supercharger described above, the reinforcing member may be provided with a boss that fixes another member to the turbine housing. In recent years, internal combustion engines that are provided with an insulator which covers a supercharger so as to suppress transmission of heat radiated from the supercharger to members around the supercharger have been in practical use. When the supercharger is fixed to the internal combustion engine, the supercharger may be fixed via a turbo stay with one end fixed to a cylinder head and a cylinder block.

In the configuration described above, a boss that fixes the other members such as the insulator and the turbo stay to the supercharger is disposed in the reinforcing member. Accordingly, the reinforcing member also has a function of the boss. Thus, the number of components of the supercharger can be reduced compared to a case where an additional boss is disposed for mounting of the other members.

In the supercharger described above, the reinforcing member may be disposed in a position where the outer circumferential surface of the turbine housing where a distance from the outer circumferential surface to the bypass port is the shortest. According to the configuration described above, assemblability is improved when the reinforcing member is inserted from the outer circumferential surface of the turbine housing.

In a case where, for example, a bolt is adopted as the reinforcing member, a bolt screwing amount can be decreased. In a case where, for example, a pin is adopted as the reinforcing member, a pin insertion amount can be decreased. As a result, the operation time that is required for the insertion of the reinforcing member can be shortened, and assemblability can be improved.

In the supercharger described above, the waste gate valve may include a valve portion configured to abut against the bypass port, an arm portion with a first end portion connected to the valve portion, a rotating shaft connected to a second end portion of the arm portion, and an actuator. The waste gate valve may be a swing valve that may be configured to rotate the rotating shaft by using the actuator, and the waste gate valve is configured to oscillate the valve portion about the second end portion as a fulcrum. The reinforcing member may be disposed at a part of the turbine housing surrounding the bypass passage which is positioned toward the fulcrum with respect to an axial center of the bypass passage.

In a case where the waste gate valve is a swing valve, a force of the actuator that oscillates the waste gate valve acts on the second end portion of the arm portion via the rotating shaft. Accordingly, the impact that acts on the bypass port when the waste gate valve is closed is larger on the second end portion side of the arm portion on which the force from the actuator acts, that is, the fulcrum side of the waste gate valve.

According to the configuration described above, the reinforcing member is disposed in a direction that is the same as the direction in which the fulcrum of the waste gate valve, that is, the second end portion of the arm portion, is positioned with respect to the axial center of the bypass passage at the part of the turbine housing surrounding the bypass passage. Accordingly, the reinforcing member is arranged at a part subjected to impact. Accordingly, the reinforcing member can be effectively arranged and a deformation of the turbine housing can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
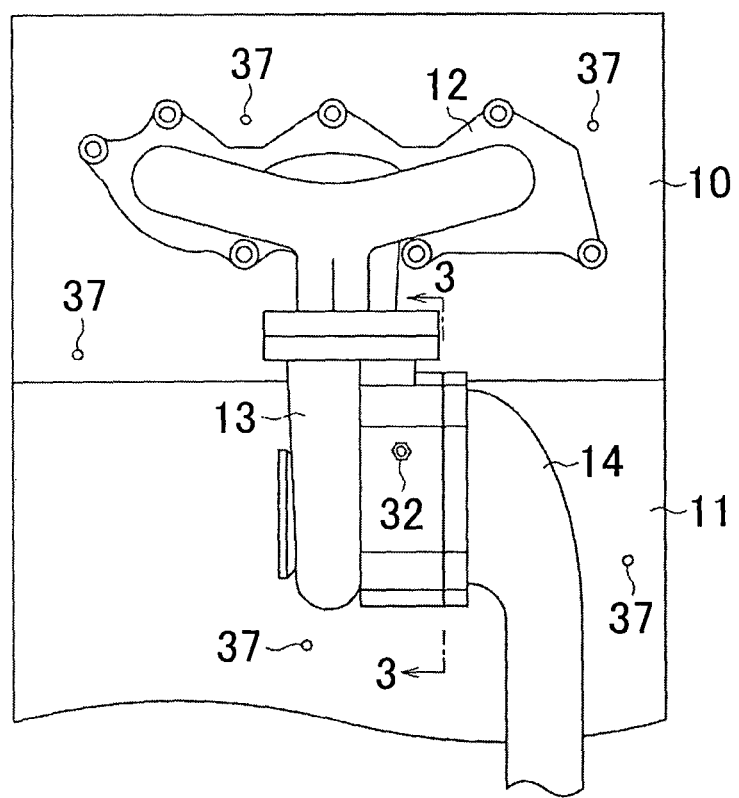
FIG. 1 is a front view illustrating a state where a supercharger according to an embodiment is assembled in an internal combustion engine.

Hereinafter, an embodiment of a supercharger will be described with reference to FIGS. 1 to 6. As illustrated in FIG. 1, a cylinder head 10 and a cylinder block 11 are disposed in an internal combustion engine on which the supercharger is mounted.

An exhaust manifold 12 is fixed to a side wall of the cylinder head 10. A turbine housing 13 of the supercharger is connected to the exhaust manifold 12. An exhaust pipe 14 is connected to the turbine housing 13.

An inner portion of the exhaust manifold 12 communicates with a combustion chamber that is disposed in the cylinder head 10. Exhaust gas that is discharged to the exhaust manifold 12 from the combustion chamber flows to the exhaust pipe 14 through the turbine housing 13. Hereinafter, an side in a flow direction of the exhaust gas will be simply referred to as an exhaust upstream side, and a downstream side in the flow direction of the exhaust gas will be simply referred to as an exhaust downstream side.

Figure 2:
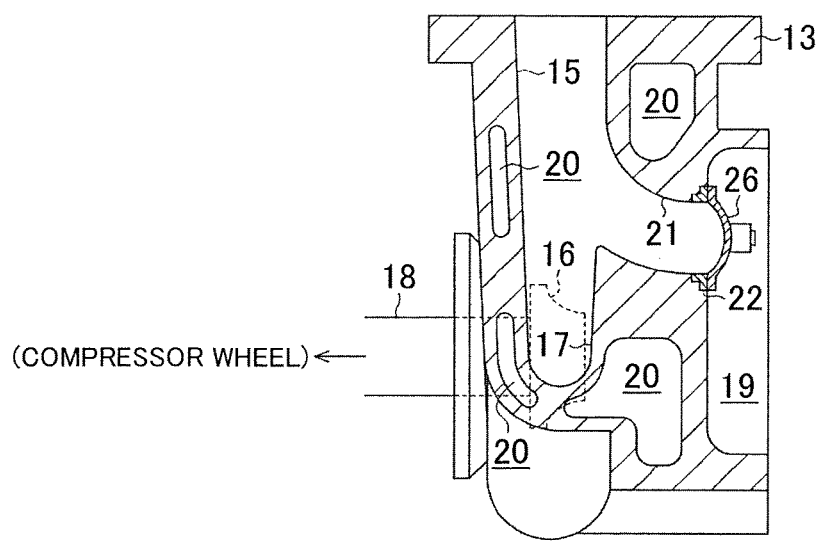
FIG. 2 is a section view illustrating a structure of a turbine housing of the supercharger of the embodiment.

Next, a configuration of the supercharger will be described with reference to FIGS. 2 to 5. As illustrated in FIG. 2, an exhaust inlet portion 15 and a scroll passage 17 are disposed in the turbine housing 13 of the supercharger. The exhaust gas flows into the exhaust inlet portion 15 from the exhaust manifold 12. The scroll passage 17 guides the exhaust gas from the exhaust inlet portion 15 to a turbine chamber in which a turbine wheel 16 is accommodated. The turbine housing 13 is manufactured by, for example, casting aluminum. The turbine wheel 16 is connected to a compressor wheel of the supercharger that is disposed in an intake passage via a shaft 18 for rotating the turbine wheel 16. An outlet chamber 19 is disposed on an exhaust downstream side from the turbine chamber. A coolant passage 20 that allows a coolant to flow is disposed in the turbine housing 13.

A bypass passage 21 that allows the exhaust inlet portion 15 and the outlet chamber 19 to communicate with each other by bypassing the turbine chamber is disposed in the turbine housing 13. A bypass port 22 having an annular shape which is formed of, for example, stainless steel, is fitted into an exhaust downstream side end portion of the bypass passage 21.

Figure 3:
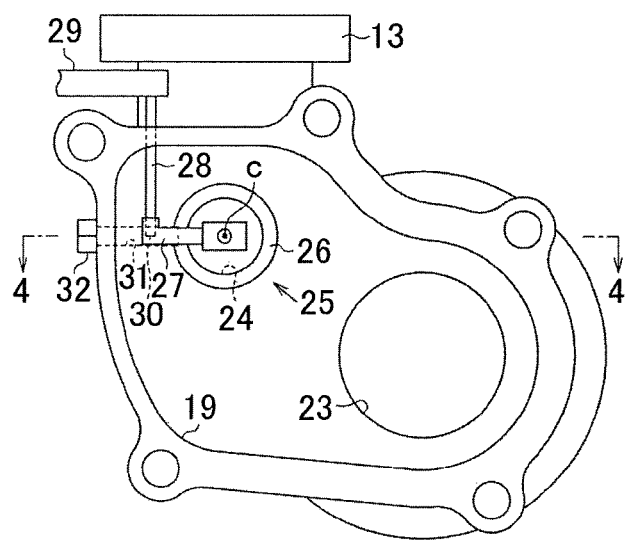
FIG. 3 is a side view of the supercharger viewed in the arrow 3 direction in FIG. 1.

As illustrated in FIG. 3, a turbine chamber side exhaust hole 23 and a bypass passage side exhaust hole 24 are disposed in the outlet chamber 19. The exhaust from the turbine chamber is discharged from the turbine chamber side exhaust hole 23. The exhaust gas from the bypass passage 21 is guided from the bypass passage side exhaust hole 24. A waste gate valve 25 that opens or closes the bypass passage side exhaust hole 24 is disposed in the outlet chamber 19.

Figure 4:
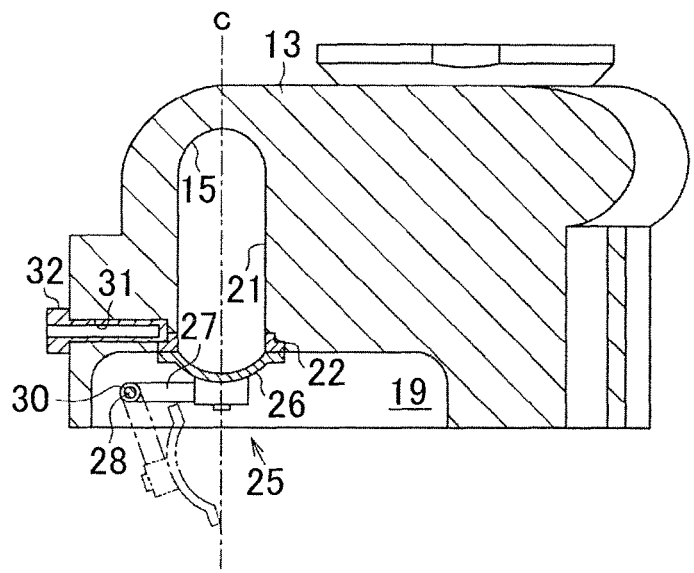
FIG. 4 is a sectional view taken along line 4-4 in FIG. 3.

As illustrated in FIGS. 3 and 4, the waste gate valve 25 is provided with a valve body 26 and an arm portion 27. The valve body 26 abuts against the bypass port 22, and has a dome shape. The arm portion 27 is bent upward in FIG. 3 with a first end portion of the arm portion 27 connected to the valve body 26. A third end portion of a rotating shaft 28 is fitted into a second end portion 30 of the arm portion 27. A link mechanism 29 that is driven by an actuator is connected to a fourth end portion of the rotating shaft 28. The link mechanism 29 is disposed to be rotatable about a part to which the rotating shaft 28 is fixed. In other words, the actuator rotates the link mechanism 29 in the depth direction of the page surface in FIG. 3 and rotates the rotating shaft 28.

When the link mechanism 29 rotates the rotating shaft 28 in the clockwise direction in FIG. 4, the waste gate valve 25 rotates about the second end portion 30 of the arm portion 27 of the waste gate valve 25 as a fulcrum as illustrated by the dashed line in FIG. 4. Then, the waste gate valve 25 and the bypass port 22 are separated from each other. The waste gate valve 25 is in an open state in this manner. The rotating shaft 28 is rotated in the counterclockwise direction in FIG. 4 when the waste gate valve 25 is to be closed. As illustrated by the solid line in FIG. 4, the waste gate valve 25 and the bypass port 22 abut against each other. In other words, the waste gate valve 25 is a swing valve that oscillates about the second end portion 30 of the arm portion 27 as a fulcrum. The bypass passage 21 is opened or closed when the waste gate valve 25 is controlled in this manner.

In a case where the waste gate valve 25 is opened and communicates with the bypass passage 21, a part of the exhaust gas that is discharged into the turbine housing 13 from the exhaust manifold 12 is discharged to the outlet chamber 19 through the bypass passage 21. In other words, a part of the exhaust gas flows by bypassing the turbine chamber. In a case where the waste gate valve 25 is closed and the bypass passage 21 is blocked, almost the entire amount of the exhaust flows into the scroll passage 17 from the exhaust inlet portion 15. The exhaust gas that flows into the scroll passage 17 flows to the turbine chamber through the scroll passage 17 and rotates the turbine wheel 16 accommodated in the turbine chamber. In this manner, the compressor wheel rotates and intake air is supercharged.

A bolt hole 31 that extends from an outer circumferential surface of the turbine housing 13 to a part where the bypass port 22 is supported is disposed in the turbine housing 13 of the supercharger. A bolt 32 as a reinforcing member is inserted into the bolt hole 31. The bolt 32 is formed of, for example, steel and iron, and is formed of a material higher in rigidity than the turbine housing 13 formed of aluminum. The bolt 32 abuts against a second surface of the bypass port 22 on the side opposite to a first surface of the bypass port 22 against which the waste gate valve 25 abuts. In other words, a part of the bypass port 22 is in a state of being pinched by the waste gate valve 25 and the bolt 32, as illustrated in FIG. 4, when the waste gate valve 25 is closed.

Figure 5:
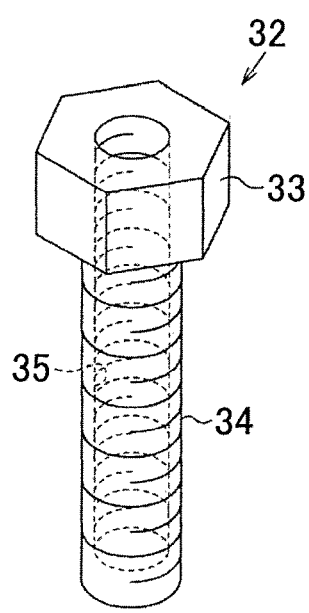
FIG. 5 is a perspective view of a bolt that is disposed in the supercharger of the embodiment.

As illustrated in FIG. 5, a head portion 33 that has a hexagonal cross-sectional shape and a columnar portion 34 that is connected to the head portion 33 and has a male thread formed in an outer circumferential surface constitute the bolt 32. A hollow portion 35 that is open to the head portion 33 of the bolt 32 is disposed in the bolt 32. An female thread is formed in an inner circumferential surface of the hollow portion 35. In other words, the hollow portion 35 of the bolt 32 functions as a boss when another bolt is screwed from the head portion 33 side of the bolt 32 so that the bolts can be screwed with each other. As illustrated in FIGS. 3 and 4, the bolt 32 is arranged at a part of the turbine housing 13 surrounding the bypass passage 21 which is positioned toward the second end portion 30 of the arm portion 27 of the waste gate valve 25 with respect to an axial center C of the bypass passage 21.

Figure 6:
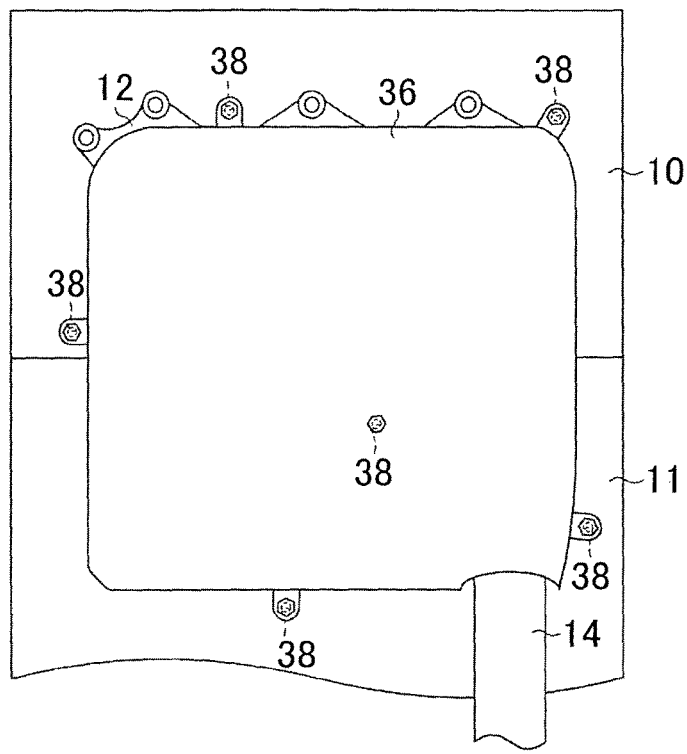
FIG. 6 is a front view illustrating a state where an insulator is mounted on the internal combustion engine that is provided with the supercharger of the embodiment.

An insulator 36 that suppresses transmission of heat which is radiated from the supercharger to surrounding members is disposed in the internal combustion engine. As illustrated in FIG. 1, a plurality of bosses 37, where bolt holes fixing the insulator 36 are formed, are formed in the cylinder head 10 and the cylinder block 11. As illustrated in FIG. 6, a plurality of insertion holes 38 for bolt insertion are disposed in the insulator 36. The insulator 36 is fixed to the internal combustion engine when bolts are fastened into the insertion holes 38 and the bosses 37. The insulator 36 is fixed to the supercharger when a bolt that is inserted into the insertion holes 38 which is disposed at a substantially central part of the insulator 36 is fastened into the hollow portion 35 of the bolt 32 disposed in the turbine housing 13.

Next, an operation of the supercharger of this embodiment will be described. When the waste gate valve 25 is closed, the waste gate valve 25 abuts against the bypass port 22. Accordingly, an impact that is generated when the waste gate valve 25 and the bypass port 22 collide with each other acts on the bypass port 22 and the turbine housing 13 supporting the bypass port 22.

In this embodiment, the bolt 32 is disposed at a part of the turbine housing 13 to which the bypass port 22 is fixed, and the bolt 32 abuts against the second surface of the bypass port 22 on the side opposite to the first surface of the bypass port 22 against which the waste gate valve 25 abuts. Also, the bolt 32 extends to the outer circumferential surface of the turbine housing 13.

An outer side part (outer circumferential surface) of the turbine housing 13 is cooled by outside air, and is maintained in a state where rigidity is higher at an outer circumferential surface side part. This is because temperature is likely to decline at the outer side part compared to an inner side part where the exhaust passes even in the turbine housing 13 of the water-cooled supercharger.

Accordingly, the bolt 32 is supported at the part of the turbine housing 13 that is positioned outside the part where the bypass port 22 is supported and is maintained in a state of higher rigidity in this embodiment. Accordingly, the bypass port 22 is supported by the bolt 32 even when a force pressing the bypass port 22 acts on the bypass port 22 from the waste gate valve 25 as a result of closing of the waste gate valve 25. Accordingly, a movement of the bypass port 22 in a pressing direction of the waste gate valve 25 is suppressed.

Since the bolt 32 extends to the outer circumferential surface of the turbine housing 13, the bolt 32 is cooled by outside air. Accordingly, decline in rigidity of the bolt 32 attributable to temperature rise is suppressed.

The bolt 32 is provided with the boss that is formed of the hollow portion 35 in which the female thread is formed so that the bolt 32 can also have a function of the boss. In this manner, the number of components of the supercharger is reduced compared to a case where an additional boss is disposed to fix the insulator 36 to the supercharger.

In a case where the waste gate valve 25 is a swing valve, the force of the actuator oscillating the waste gate valve 25 acts on the second end portion 30 of the arm portion 27 via the rotating shaft 28. Accordingly, the impact that acts on the bypass port 22 when the waste gate valve 25 is closed is larger on the second end portion 30 side of the arm portion 27 where the force from the actuator acts, that is, the fulcrum side of the waste gate valve 25.

In this embodiment, the bolt 32 is arranged at the part of the turbine housing 13 surrounding the bypass passage 21 which is positioned toward the second end portion 30 of the waste gate valve 25 with respect to the axial center C of the bypass passage 21. Accordingly, the bolt 32 is arranged at a part subjected to a large impact.

According to the supercharger of the embodiment described above, the following effects are achieved.

(1) The bypass port 22 is supported by the bolt 32 that is disposed as a reinforcing member, and thus the movement of the bypass port 22 in the pressing direction of the waste gate valve 25 is suppressed. Accordingly, the waste gate valve 25 and the bypass port 22 can be maintained in a close-contact state when the waste gate valve 25 is closed. Accordingly, deterioration in sealability of the waste gate valve 25 can be suppressed according to the configuration described above.

(2) Since the bolt 32 extends to the outer circumferential surface of the turbine housing 13, the bolt 32 is cooled by outside air. Accordingly, decline in supporting force can be suppressed when the bypass port 22 is supported against the impact resulting from closing of the waste gate valve 25. Since the bolt 32 can be supported at a high-rigidity part of the turbine housing 13, a movement of the bypass port 22 attributable to the impact at a time when the waste gate valve 25 is closed is suppressed. Accordingly, deterioration in sealability of the waste gate valve 25 can be suppressed according to the configuration described above.

(3) The bolt 32 is provided with the boss fixing the insulator 36 to the turbine housing 13; and thus the number of components of the supercharger can be reduced compared to a case where an additional boss is disposed for mounting of the insulator 36.

(4) The waste gate valve 25 is a swing valve that oscillates about the second end portion 30 of the arm portion 27 as a fulcrum, and the bolt 32 is disposed at the part of the turbine housing 13 surrounding the bypass passage 21 which is positioned toward the fulcrum of the waste gate valve 25 with respect to the axial center C of the bypass passage 21. Accordingly, the bolt 32 can be arranged at the part subjected to the large impact. Accordingly, the bolt 32 can be arranged effectively and a deformation of the turbine housing 13 can be suppressed.

Figure 7:
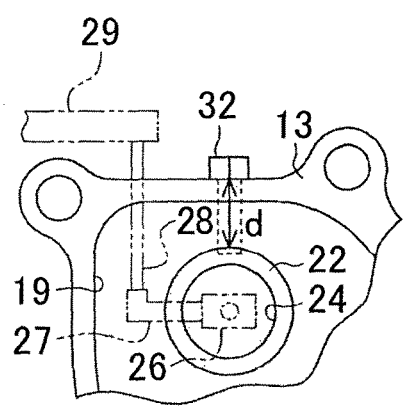
FIG. 7 is a side view of a turbine housing illustrating a positional relationship between a bypass port and a bolt in a supercharger according to another example of the embodiment.

The embodiment described above can be modified as follows. The modification examples may also be combined as appropriate. The position where the bolt 32 is disposed can be appropriately changed insofar as the position of the bolt 32 can suppress a movement of the bypass port 22 caused by the impact at a time of valve closing. For example, the position of the bolt 32 can be changed as illustrated in FIG. 7. In the supercharger that is illustrated in FIG. 7, the same reference numerals are attached to the same configuration as in the embodiment described above, and detailed description thereof will be omitted.

As illustrated in FIG. 7, the bypass port 22 is fixed to the bypass passage side exhaust hole 24 that is disposed in the outlet chamber 19. When a distance from the bypass port 22 to the outer circumferential surface of the turbine housing 13 is a distance d, the bolt 32 is inserted from a position of the turbine housing 13 where the distance d is the shortest.

According to this configuration, the amount of screwing the bolt 32 can be decreased when the bolt 32 is assembled with the supercharger. Accordingly, the following effect can be achieved in addition to effects similar to (1) to (3) above according to this configuration.

(5) The length of the time that is required for the insertion of the bolt 32 can be shortened, and assemblability can be improved.

In the example above, the bolt 32 is provided with the boss fixing the insulator 36. However, this configuration may be omitted when an additional boss is disposed. Effects similar to (1) and (2) above can also be achieved with this configuration.

In the embodiment described above, the bolt 32 that is disposed in the turbine housing 13 to abut against the bypass port 22 and a bolt that fixes the insulator 36 to the supercharger are separately disposed. However, the functions of the two bolts can also be combined in a single bolt. In other words, a bolt may be screwed into the bolt hole 31 of the turbine housing 13 via the insertion holes 38 of the insulator 36 so that this bolt fixes the insulator 36 and supports the bypass port 22. According to this configuration, the number of components can be further reduced.

In the embodiment described above, the insulator 36 has been described as an example of the members assembled with the supercharger. However, other members such as a turbo stay fixing the supercharger may also be assembled. In the embodiment described above, a configuration for assembling the members such as the insulator 36 with the supercharger has been illustrated, but the configuration may be omitted.

In the embodiment described above, an example in which only one bolt 32 is provided as the reinforcing member has been described. However, a plurality of the bolt 32 may be provided as the reinforcing member. In the embodiment described above, the bolt 32 is used as the reinforcing member. However, the reinforcing member is not limited to the bolt 32, and other reinforcing members such as a pin may also be used.

In the embodiment described above, a configuration in which the bolt 32 that is the reinforcing member extends to the outer circumferential surface of the turbine housing 13 has been described. However, the reinforcing member may not extend to the outer circumferential surface of the turbine housing 13. For example, the reinforcing member may be arranged in a state where the reinforcing member is accommodated in the turbine housing 13. An effect similar to (1) above can also be achieved with this configuration.

In the embodiment described above, an example in which aluminum is adopted as the material of the turbine housing 13 has been described. However, other materials such as iron may also be adopted as the material of the turbine housing 13. In this case, the reinforcing member may be formed of a material higher in rigidity than the material constituting the turbine housing 13.

In the embodiment described above, the water-cooled supercharger in which the coolant passage 20 is disposed has been described as an example of the supercharger. However, a technical idea similar to that of the embodiment described above can also be applied to a supercharger in which the coolant passage 20 is not disposed.

What is claimed is:

1. A supercharger comprising:
    a turbine housing including a bypass passage that allows exhaust gas to flow such that the exhaust gas bypasses a turbine chamber;
    a waste gate valve being configured to open and close the bypass passage;
    a bypass port being fixed to the turbine housing, the waste gate valve being configured to abut against a first surface of the bypass port when the waste gate valve is closed; and
    a bolt being disposed at a part of the turbine housing that supports the bypass port,
        the bolt being formed of a material higher in rigidity than a material constituting the turbine housing,
        the bolt being configured to abut against a second surface of the bypass port, the second surface being on a side opposite to the first surface of the bypass port, and
        the bolt extending from the second surface toward an outer side of the turbine housing.

2. The supercharger according to claim 1, wherein the bolt extends to an outer circumferential surface of the turbine housing.

3. The supercharger according to claim 2, wherein the bolt includes a hollow portion that is configured to attach to the turbine housing with an insulator.

4. The supercharger according to claim 2, wherein the bolt is disposed at a position on the outer circumferential surface of the turbine housing such that a distance between the position and the bypass port is a distance d, the distance d being the shortest distance between the outer circumferential surface of the turbine housing and the bypass port.

5. The supercharger according to claim 1, wherein:
the waste gate valve includes a valve portion that is configured to abut against the bypass port, an arm portion with a first end portion that is connected to the valve portion, a rotating shaft that is connected to a second end portion of the arm portion, and an actuator,
the waste gate valve is a swing valve that is configured to rotate the rotating shaft by using the actuator, and the waste gate valve is configured to oscillate the valve portion about the second end portion as a fulcrum, and
the bolt is disposed at a part of the turbine housing surrounding the bypass passage that is positioned toward the fulcrum with respect to an axial center of the bypass passage.

* * * * *